United States Patent [19]

Nagashima et al.

[11] Patent Number: 5,292,496
[45] Date of Patent: Mar. 8, 1994

[54] PROCESS FOR THE PREPARATION OF HYDROGEN PEROXIDE

[75] Inventors: Hiromitsu Nagashima, Kashiwa; Yukio Ishiuchi, Ushiku; Yasushi Hiramatsu, Niigata; Michiya Kawakami, Tokyo, all of Japan

[73] Assignee: Mitsubishi Gas Chemical Company, Inc., Tokyo, Japan

[21] Appl. No.: 967,380

[22] Filed: Oct. 28, 1992

[30] Foreign Application Priority Data

Oct. 31, 1991 [JP] Japan ................................. 3-314073

[51] Int. Cl.$^5$ ............................................ C01B 15/01
[52] U.S. Cl. ..................................... 423/584; 502/303; 502/304
[58] Field of Search ................ 502/303, 304; 423/584

[56] References Cited

U.S. PATENT DOCUMENTS

| | | | |
|---|---|---|---|
| 2,368,640 | 2/1945 | Cook | 423/584 |
| 3,024,199 | 3/1962 | Pasfield | 502/304 |
| 4,889,705 | 12/1989 | Gosser | 423/584 |
| 5,080,877 | 1/1992 | Chane-Ching et al. | 502/304 |
| 5,135,731 | 8/1992 | Gosser et al. | 423/584 |

FOREIGN PATENT DOCUMENTS 0274830  7/1988  European Pat. Off. .
0431932  6/1991  European Pat. Off. .

OTHER PUBLICATIONS

Chemical Abstracts 117(24):236704t (1993).
Database WPIL Week 9241, Derwent Publications Ltd., London, GB; AN 92-335296/41 & JP-A-4 238 802 (Mitsubishi Gas Chem. Co., Inc., Aug. 26, 1992).

*Primary Examiner*—Wayne Langel
*Attorney, Agent, or Firm*—Sherman and Shalloway

[57] ABSTRACT

Oxygen and hydrogen are catalytically reacted in an acidic reaction medium in the presence of a platinum group metal catalyst to prepare hydrogen peroxide using as a carrier for the platinum group metal catalyst a composite oxide containing cerium. The process need not halogen ions in the acidic reaction medium and enables preparation of hydrogen peroxide in high concentration on an industrial scale advantageously.

18 Claims, No Drawings

PROCESS FOR THE PREPARATION OF HYDROGEN PEROXIDE

BACKGROUND OF THE INVENTION

1. Field of the Invention

The present invention relates to an improved process for the preparation of hydrogen peroxide by catalytic reaction between oxygen and hydrogen in a reaction medium in the presence of a catalyst. More particularly, the present invention relates to an improved process for the preparation of hydrogen peroxide by catalytic reaction between oxygen and hydrogen in a reaction medium containing substantially no halogen ion in the presence of platinum group metal catalyst.

2. Description of the Prior Arts

Processes mainly used for preparing hydrogen peroxide on an industrial scale are autooxidation processes using an alkylanthraquinone as a reaction medium. These processes have problems that reduction, oxidation, extraction and separation with water, purification, concentration and the like processes are complicated and costs for apparatuses and operation are high. Further, additional problems are encountered such as loss of alkylanthraquinones by deterioration and deterioration of activity of the hydrogenation catalyst.

In order to solve these problems, other process for the preparation of hydrogen peroxide have been proposed. One of such proposals is a process in which hydrogen peroxide is prepared directly from oxygen and hydrogen using a catalyst in a reaction medium. For example, a process has been proposed in which a platinum group metal is used as the catalyst for the preparation of hydrogen peroxide from oxygen and hydrogen. This process is known to be successful in preparing hydrogen peroxide in a considerably high concentration (cf., for example, U.S. Pat. Nos. 4,009,252, 4,279,883 and 4,772,458, and European Patent Application Laid-Open No. 0132294A1).

The conventional processes perform the reaction in a reaction medium having dissolved therein an acid or an inorganic salt. In particular, the selectivity of hydrogen peroxide and its concentration are increased by the addition of halogen ions in the reaction medium. For example, U.S. Pat. No. 4,772,458 supra describes that in the preparation of hydrogen peroxide from oxygen and hydrogen in an aqueous solution made acidic with sulfuric acid under pressure, copresence of halogen ions such as bromide ions in the aqueous solution makes it possible to prepare hydrogen peroxide selectively in a high concentration.

In preparing hydrogen peroxide by catalytic reaction between oxygen and hydrogen in a reaction medium, in order to obtain hydrogen peroxide in a practically acceptable high concentration by the aforementioned conventional processes, it has been considered indispensable to have an acid and halogen ions contained in the reaction medium. Thus, when halogen ions are present in a high concentration in an acidic reaction medium, the apparatus for handling the reaction mixture suffers severe corrosion and hence not only materials which can be used for such apparatuses are limited considerably but also the elution of the catalyst component into the reaction medium is unavoidable. In particular, the amount of the catalyst component eluted into the reaction medium increases proportionally to the concentration of halogen ions.

Such an elution of the catalyst component causes decrease in the activity of the catalyst and reduction in the lifetime of the catalyst. In addition, the metal, which is the catalyst component, eluted into the reaction medium not only deteriorates the quality or grade of hydrogen peroxide as the product but also it is difficult industrially to recover the catalyst component metal which eluted in a low concentration.

On the other hand, it is also known that the presence of halogen ions decreases the activity of the platinum group metal catalyst. Further, the above-described process requires expensive, anticorrosive materials for the reaction vessel and post treatment for the removal of halogen ions, if necessary for the purpose for which the resulting hydrogen peroxide is used, which incurs high cost.

SUMMARY OF THE INVENTION

Intensive investigation on the development of an improved process for the preparation of hydrogen peroxide by catalytic reaction between oxygen and hydrogen in the presence of a platinum group metal catalyst in which process hydrogen peroxide can be obtained in a high concentration in a reaction medium containing substantially no halogen ions.

As a result, the present inventors have found that the use of a catalyst composition comprising a composite oxide containing cerium and a platinum group metal carried thereon enables preparation of hydrogen peroxide in a high concentration in an acidic reaction medium containing substantially no halogen ions. The present invention has been completed based on this discovery.

According to the present invention, there is provided a process for the preparation of hydrogen peroxide by catalytically reacting oxygen with hydrogen in an acidic reaction medium in the presence of a platinum group metal catalyst, in which a composite oxide containing cerium is used as a carrier for the platinum group metal catalyst.

The process of the present invention needs no post-treatment for the removal of halogen ions from the hydrogen peroxide obtained as the product since the process uses a reaction medium which contains substantially no halogen ions. Further, because decrease in the activity of the catalyst which is caused by the presence of halogen ions is minimized, the process of the present invention is advantageous industrially.

The composite oxide carrier containing cerium which is used in the invention is a composite of cerium oxide and one or more other metal oxides such as oxides of titanium and zirconium, which is a kind of composite oxide compound formed from cerium oxide and other metal oxide or oxides in which composite oxide the metal oxides are no longer present in their original single forms as structural units. Such a composite oxide can be prepared by a conventional technique for preparing catalyst carriers known per se such as an impregnation method or a coprecipitation method. The proportion of cerium in the composite oxide is 0.01 to 99% by weight, preferably 1 to 90% by weight, as cerium oxide. The form of the composite oxide carrier is not limited particularly and various forms may be used including granule, powder, etc.

The metal elements which can be used in combination with cerium in the composite oxide which constitutes the catalyst carrier, include preferably those metal elements belonging to the group III or IV in the periodical table, among which at least one member selected from the group consisting of titanium, zirconium and lanthanum is particularly preferred.

The catalyst used for the preparation of hydrogen peroxide in the present invention is one comprising an active ingredient composed mainly of a platinum group metal element carried on the aforementioned composite oxide carrier. More specifically, palladium, platinum, etc. can be used singly or as mixtures or alloys. Further, mixtures or alloys thereof with one or more ruthenium, osmium, rhodium, iridium, gold, etc. may also be used. Usually, palladium or platinum is used in most cases, with palladium being particularly preferred. The amount of the active ingredient to be carried on the carrier is generally 0.1 to 10% by weight. A known method can be used for having the active ingredient which is a platinum group metal catalyst carried on a carrier. The catalyst used in the process for the preparation of hydrogen catalyst according to the present invention is usually at least 1 g per liter of the reaction medium. The catalyst can be used in the form of a slurry.

The reaction medium used in the present invention is an acidic aqueous solution having added therein an inorganic acid containing no halogen ions such as sulfuric acid, nitric acid or phosphoric acid. In this case, the concentration of inorganic acid is $1 \times 10^{-3}$ to 10 mole/liter, and preferably $1 \times 10^{-2}$ to 2 mole/liter, as hydrogen ion concentration.

Known stabilizers or the like additives may be added to the reaction medium in order to prevent the decomposition of hydrogen peroxide. Reaction conditions for the preparation of hydrogen peroxide from hydrogen and oxygen using the aforementioned platinum group metal catalyst in the presence or absence of inert gases which give no adverse effect on the reaction such as nitrogen are usually a reaction pressure of 3 to 150 kg/cm$^2$.G, a reaction temperature of 0° to 50° C., and a reaction time of 30 minutes to 6 hours.

EXAMPLES

Hereafter, the present invention will be described in more detail by examples and comparative examples. However, these are intended to help one understand the present invention and the present invention should not be construed as being limited thereto. Analytical values found of the gas compositions used in the examples are those obtained by gas chromatography. The measurement of the concentration of hydrogen peroxide in the reaction mixture after the reaction was over was made by titration using sulfuric acid-potassium permanganate solution.

EXAMPLE 1

A catalyst carrier was prepared as follows. That is, 266 ml of a commercially available aqueous titanium sulfate solution (a product containing 24% of titanium sulfate, produced by Kanto Chemical Company, Inc.) were mixed with an aqueous solution of 9.5 g of commercially available cerium nitrate hexahydrate (produced by Kanto Chemical Company, Inc.) in 50 ml of deionized water and 10% ammoniacal water was dropwise added to the resulting mixture so as to adjust the pH of the mixed solution to about 8 to coprecipitate mixed hydroxides of cerium and titanium. The precipitates were filtered and washed with water until the washings became neutral, and then dried in a drier at 110° C. for one day and night. Thereafter, the dried precipitates were calcined at 500° C. for 3 hours in an air stream to obtain a titanium-cerium composite oxide carrier. In this case, the composition was adjusted so that the weight ratio of titanium oxide to cerium oxide in the composite oxide was 85% to 15%. The thus obtained carrier was impregnated with an aqueous palladium nitrate solution so that palladium as an active ingredient was carried on the carrier in an amount of 1% by weight based on the weight of the carrier, followed by calcination at 400° C. for 2 hours in an air stream and then reduction at 200° C. for 1 hour in a hydrogen stream to obtain a palladium catalyst. Using the thus obtained catalyst, the following procedures were carried out in order to produce hydrogen oxide directly from oxygen and hydrogen.

In a 65 ml glass vessel was charged 10 g of an aqueous solution containing 0.1M sulfuric acid. To this solution were added 50 mg of the palladium catalyst carried on the carrier, which was formed as above. The glass vessel was placed in a 100 ml autoclave, and after conducting a pressure test with a mixed gas composed of 3.5% by volume of hydrogen gas, 35% by volume of oxygen gas and 61.5% by volume of nitrogen gas, the pressure of the autoclave was increased to 50 kg/cm$^2$.G with the mixed gas having the same composition as used in the pressure test. While keeping the temperature at 10° C., the mixture in the vessel was stirred at 2,000 rpm for 1 hour. After completion of 1 hour's stirring, the reaction mixture contained hydrogen peroxide in a concentration of 0.40% by weight and hydrogen selectivity of produced hydrogen peroxide was 75%. The hydrogen selectivity was calculated according to the following equation.

---

Hydrogen Selectivity (%) =
[(amount of hydrogen peroxide produced by reaction)/
(theoretical amount of hydrogen peroxide produced
calculated from the amount of hydrogen consumed)] × 100

---

EXAMPLE 2

The procedures in Example 1 were repeated for preparing a catalyst and performing the reaction for preparing hydrogen peroxide with the catalyst except that upon preparing the catalyst, a zirconium-cerium composite oxide was used which had a composition adjusted such that the weight ratio of zirconium oxide to cerium oxide in the composite oxide was 85% to 15% and which had been prepared by using a solution of 46.1 g of commercially available zirconyl nitrate (produced by Kanto Chemical Company, Inc.) dissolved in 200 ml of deionized water instead of 266 ml of the commercially available titanium sulfate solution (produced by Kanto Chemical Company, inc.) in Example 1. After 1 hours's stirring, the reaction mixture contained hydrogen peroxide in a concentration of 0.34% by weight and hydrogen selectivity of produced hydrogen peroxide was 80%.

EXAMPLE 3

The procedures in Example 1 were repeated for preparing a catalyst and performing the reaction for preparing hydrogen peroxide with the catalyst except that upon preparing the catalyst, a lanthanum-cerium composite oxide was used which had a composition adjusted such that the weight ratio of lanthanum oxide to cerium oxide in the composite oxide was 15% to 85% and which had been prepared by using a solution of 1.8 g of commercially available lanthanum nitrate hexahydrate (produced by Kanto Chemical Company, Inc.) dissolved in 50 ml of deionized water instead of 266 ml of the commercially available titanium sulfate solution (produced by Kanto Chemical Company, Inc.) in Example 1. After 1 hour's stirring, the reaction mixture contained hydrogen peroxide in a concentration of 0.32% by weight and hydrogen selectivity of produced hydrogen peroxide was 65%.

EXAMPLE 4

The procedures in Example 1 were repeated for preparing a catalyst and performing the reaction for preparing hydrogen peroxide with the catalyst except that upon preparing the catalyst, a silicon-cerium composite oxide carrier was used which had a composition adjusted such that the weight ratio of silicon oxide to cerium oxide in the composite oxide was 85% to 15% and which had been prepared by mixing a suspension of 8.5 g of powdery silicon dioxide (produced by Mizusawa Industrial Chemicals, Ltd.) in deionized water with an aqueous solution of 3.8 g of commercially available cerium nitrate hexahydrate (produced by Kanto Chemical Company, Inc.) in 50 ml of deionized water and the resulting mixture was impregnated to the carrier. After 1 hour's stirring, the reaction mixture contained hydrogen peroxide in a concentration of 0.20% by weight and hydrogen selectivity of produced hydrogen peroxide was 13%.

EXAMPLE 5

The procedures in Example 1 were repeated for preparing a catalyst and performing the reaction for preparing hydrogen peroxide with the catalyst except that upon preparing the catalyst, a titanium-zirconium-cerium composite oxide carrier was used which had a composition adjusted such that the weight ratio of titanium oxide: zirconium oxide: cerium oxide in the composite oxide was 40:40:20 (% by weight), and which had been prepared by coprecipitation using 50.1 ml of commercially available titanium sulfate solution (produced by Kanto Chemical Company, Inc.), an aqueous solution of 8.7 g of commercially available zirconyl nitrate (produced by Kanto Chemical Company, Inc.) dissolved in 50 ml of deionized water, and an aqueous solution of 5.0 g of commercially available cerium nitrate hexahydrate (produced by Kanto Chemical Company, Inc.) dissolved in 50 ml of deionized water. After 1 hour's stirring, the reaction mixture contained hydrogen peroxide in a concentration of 0.41% by weight and hydrogen selectivity of produced hydrogen peroxide was 78%.

EXAMPLE 6

The procedures in Example 1 were repeated for preparing a catalyst and performing the reaction for preparing hydrogen peroxide with the catalyst except that upon preparing the catalyst, a zirconium-lanthanum-cerium composite oxide carrier was used which had a composition adjusted such that the weight ratio of zirconium oxide: lanthanum oxide: cerium oxide in the composite oxide was 70:15:15 (% by weight), and which had been prepared by coprecipitation using an aqueous solution of 15.2 g of commercially available zirconyl nitrate (produced by Kanto Chemical Company, Inc.) dissolved in 100 ml of deionized water, an aqueous solution of 4.0 g of commercially available lanthanum nitrate hexahydrate (produced by Kanto Chemical Company, Inc.) dissolved in 50 ml of deionized water, and an aqueous solution of 3.8 g of commercially available cerium nitrate hexahydrate (produced by Kanto Chemical Company, Inc.) dissolved in 50 ml of deionized water. After 1 hour's stirring, the reaction mixture contained hydrogen peroxide in a concentration of 0.35% by weight and hydrogen selectivity of produced hydrogen peroxide was 72%.

EXAMPLE 7

The procedures in Example 1 were repeated for preparing a catalyst and performing the reaction for preparing hydrogen peroxide with the catalyst except that upon preparing the catalyst, a titanium-lanthanum-cerium composite oxide carrier was used which had a composition adjusted such that the weight ratio of titanium oxide: lanthanum oxide: cerium oxide in the composite oxide was 70:15:15 (% by weight), and which had been prepared by coprecipitation using an aqueous solution of 87.6 ml of commercially available titanium sulfate solution (produced by Kanto Chemical Company, Inc.), an aqueous solution of 4.0 g of commercially available lanthanum nitrate hexahydrate (produced by Kanto Chemical Company, Inc.) dissolved in 50 ml of deionized water, and an aqueous solution of 3.8 g of commercially available cerium nitrate hexahydrate (produced by Kanto Chemical Company, Inc.) dissolved in 50 ml of deionized water. After 1 hour's stirring, the reaction mixture contained hydrogen peroxide in a concentration of 0.37% by weight and hydrogen selectivity of produced hydrogen peroxide was 74%.

COMPARATIVE EXAMPLE 1

The procedures in Example 1 were repeated for preparing a catalyst and performing the reaction for preparing hydrogen peroxide with the catalyst except that upon preparing the catalyst, a zirconium-titanium composite oxide was used which had a composition adjusted such that the weight ratio of titanium oxide to zirconium oxide in the composite oxide was 15% to 85%, and which had been prepared by using a solution of 261.1 g of commercially available zirconyl nitrate (produced by Kanto Chemical Company, Inc.) dissolved in 1000 ml of deionized water instead of the aqueous solution containing 9.5 g of commercially available cerium nitrate hexahydrate (produced by Kanto Chemical Company, Inc.) in Example 1. After 1 hour's stirring, the reaction mixture contained hydrogen peroxide in a concentration of 0.01% by weight and hydrogen selectivity of produced hydrogen peroxide was at most 0.5%.

COMPARATIVE EXAMPLE 2

The procedures in Example 1 were repeated for preparing a catalyst and performing the reaction for preparing hydrogen peroxide with the catalyst except that upon preparing the catalyst, an aluminum-titanium composite oxide was used which had a composition adjusted such that the weight ratio of titanium oxide to aluminum oxide in the composite oxide was 15% to 85%, and which had been prepared by using a solution of 885.7 g of commercially available aluminum nitrate (produced by Kanto Chemical Company, Inc.) dissolved in 2000 ml of deionized water instead of the aqueous solution containing 9.5 g of commercially available cerium nitrate hexahydrate (produced by Kanto Chemical Company, Inc.) in Example 1. After 1 hour's stirring, the reaction mixture contained hydrogen peroxide in a concentration of 0.00% by weight and hydrogen selectivity of produced hydrogen peroxide was 0%.

COMPARATIVE EXAMPLE 3

The procedures in Example 1 were repeated for preparing a catalyst and performing the reaction for preparing hydrogen peroxide with the catalyst except that upon preparing the catalyst, commercially available cerium oxide (produced by Kanto Chemical Company, Inc.) alone was used as the carrier. After 1 hour's stirring the reaction mixture contained hydrogen peroxide in a concentration of 0.01% by weight and hydrogen selectivity of produced hydrogen peroxide was at most 0.5%.

COMPARATIVE EXAMPLE 4

The procedures in Example 1 were repeated for preparing a catalyst and performing the reaction for preparing hydrogen peroxide with the catalyst except that upon preparing the catalyst, commercially available zirconium oxide (produced by Koso Chemical Company, Ltd.) alone was used as the carrier. After 1 hour's stirring, the reaction mixture contained hydrogen peroxide in a concentration of 0.00% by weight and hydrogen selectivity of produced hydrogen peroxide was 0%.

COMPARATIVE EXAMPLE 5

The procedures in Example 1 were repeated for preparing a catalyst and performing the reaction for preparing hydrogen peroxide with the catalyst except that upon preparing the catalyst, commercially available titanium oxide (produced by Kanto Chemical Company, Inc.) alone was used as the carrier. After 1 hour's stirring, the reaction mixture contained hydrogen peroxide in a concentration of 0.00% by weight and hydrogen selectivity of produced hydrogen peroxide was 0%.

COMPARATIVE EXAMPLE 6

The procedures in Example 1 were repeated for preparing a catalyst and performing the reaction for preparing hydrogen peroxide with the catalyst except that upon preparing the catalyst, commercially available silicon dioxide (produced by Mizusawa Industrial Chemicals, Ltd.) alone was used as the carrier. After 1 hour's stirring, the reaction mixture contained hydrogen peroxide in a concentration of 0.00% by weight and hydrogen selectivity of produced hydrogen peroxide was 0%.

In the examples of the invention using the composite oxide carriers containing cerium the hydrogen peroxide was much higher than in the comparative examples. The use of the platinum group metal catalyst carried on the composite oxide carrier of the invention enables the preparation of hydrogen peroxide selectively in high concentrations in the absence of halogen ions in the aqueous solution used as the reaction medium. Therefore, the present invention can solve the problems caused by the presence of halogen ions in high concentrations in the reaction medium as in the conventional processes.

What is claimed is:

1. A process for the preparation of hydrogen peroxide which comprises catalytically reacting oxygen with hydrogen in an acidic reaction medium in the presence of a platinum group metal catalyst, wherein a composite oxide consisting essentially of
    (i) cerium oxide; and
    (ii) at least one member selected from the group consisting of titanium oxide, zirconium oxide and lanthanum oxide;

is used as a carrier for said platinum group metal catalyst.

2. The process as claimed in claim 1, wherein said reaction is carried out in an acidic reaction medium which contains substantially no halogen ions.

3. The process as claimed in claim 1, wherein said composite oxide contains cerium in the form of oxide in an amount of 0.01 to 99% by weight.

4. The process as claimed in claim 1, wherein said composite oxide contains cerium in the form of oxide in an amount of 1 to 90% by weight.

5. The process as claimed in claim 1, wherein said platinum group metal is palladium metal.

6. The process as claimed in claim 2, wherein said acidic reaction medium is an aqueous solution of sulfuric acid, nitric acid or phosphoric acid.

7. The process as claimed in claim 1, wherein said reaction is carried out at a temperature within the range of 0° to 50° C.

8. The process as claimed in claim 1, wherein said reaction is carried out at a pressure within the range of 3 to 150 kg/cm$^2$.G.

9. A process for the preparation of hydrogen peroxide which comprises catalytically reacting oxygen with hydrogen in an aqueous acidic reaction medium which contains substantially no halogen ions and in the presence of a platinum group metal catalyst, wherein a composite oxide consisting essentially of
    (i) 1 to 90% by weight of cerium oxide; and
    (ii) a catalytically effective amount of at least one member selected form the group consisting of titanium oxide, zirconium oxide and lanthanum oxide is used as a carrier for said platinum group metal catalyst.

10. The process as claimed in claim 9, wherein the platinum group metal is palladium.

11. The process as claimed in claim 9, wherein said reaction medium is an aqueous solution of an acid selected form the group consisting of sulfuric acid, nitric acid and phosphoric acid.

12. The process as claimed in claim 9, wherein the composite oxide contains 15 to 85% cerium oxide.

13. The process as claimed in claim 9, wherein the composite oxide contains titanium oxide and cerium oxide.

14. The process as claimed in claim 9, wherein the composite oxide contains zirconium oxide and cerium oxide.

15. The process as claimed in claim 9, wherein the composite oxide contains lanthanum oxide and cerium oxide.

16. The process as claimed in claim 9, wherein the composite oxide contains titanium oxide, zirconium oxide and cerium oxide.

17. The process as claimed in claim 9, wherein the composite oxide contains zirconium oxide, lanthanum oxide and cerium oxide.

18. The process as claimed in claim 9, wherein the composite oxide contains titanium oxide, lanthanum oxide and cerium oxide.

* * * * *